Oct. 20, 1942.     E. H. SPIEGL     2,299,414
APPARATUS FOR PRODUCING REFRIGERANTS
Filed July 15, 1940
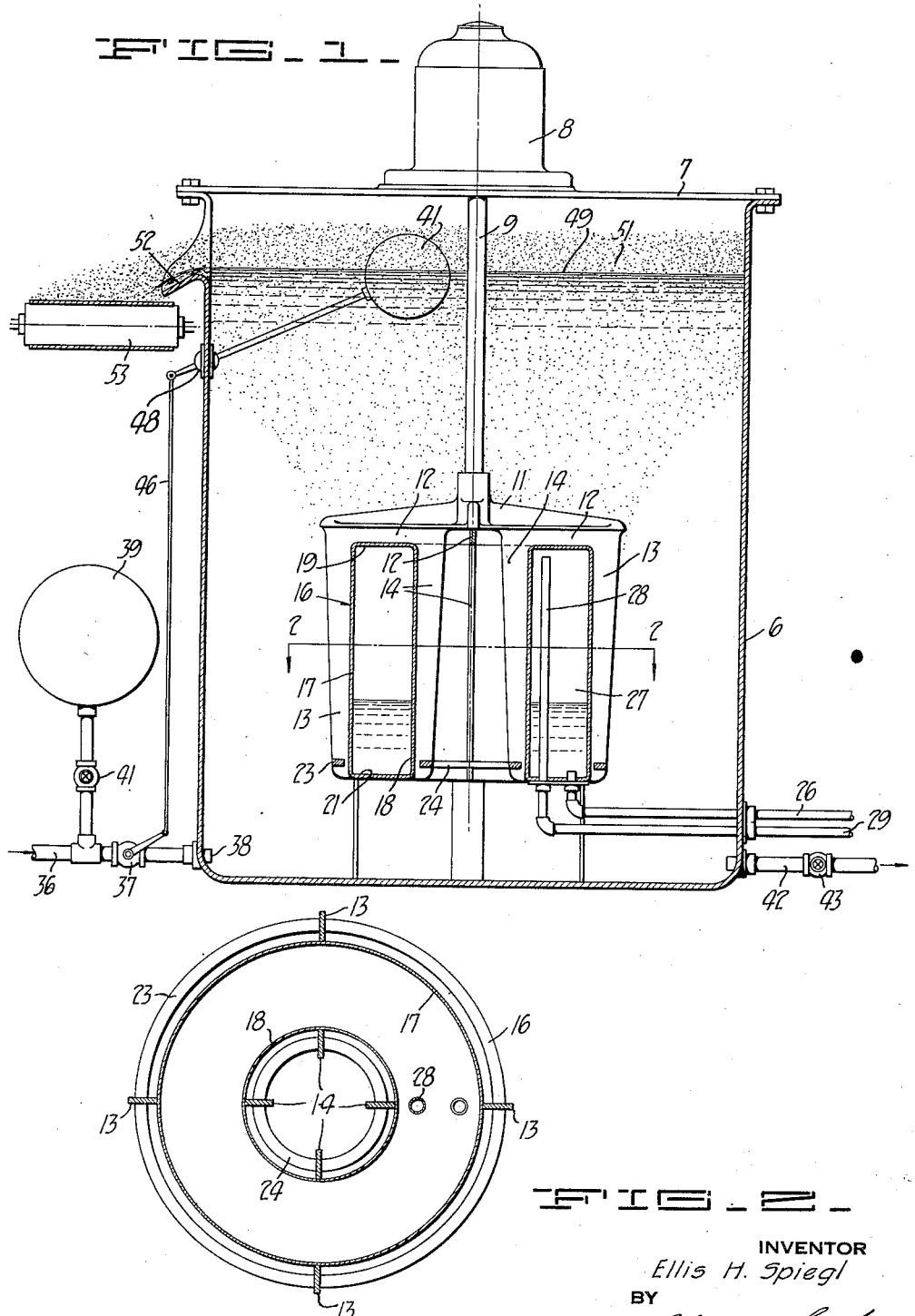
INVENTOR
Ellis H. Spiegl
BY
Marcus Lothrop Patented Oct. 20, 1942

2,299,414

UNITED STATES PATENT OFFICE 2,299,414

APPARATUS FOR PRODUCING REFRIGERANTS

Ellis H. Spiegl, Salinas, Calif.

Application July 15, 1940, Serial No. 345,572

3 Claims. (Cl. 62—106)

My invention relates to refrigerants of the kind disclosed in my copending application Serial No. 282,874, filed July 5, 1939, now Patent No. 2,259,841, and entitled "Refrigerant, method of providing the same, and refrigerant package," and is especially concerned not only with a method for producing such refrigerants but also with an apparatus for doing so. Such refrigerants comprise discreet or separate small particles of a snow-like conglomerate of water crystals, the crystals being relatively round and in mass very smooth to the touch. They are produced ordinarily by freezing portions of a light brine and removing the frozen crystals and the remaining brine to a drainage point, at which the crystals and the remaining brine are separated. The product is especially useful in the packing of produce, such as lettuce, for shipment. At the present time I produce such a refrigerant within machines of the type shown in Taylor Patent No. 1,930,570, issued October 17, 1933, for Ice machine. Such a machine includes a refrigerated cylindrical vessel within which scrapers are mechanically revolved to remove from the walls crystals which freeze thereupon from a pre-cooled liquid which is pumped through the vessel from one end to the other, in commercial practice about 75% of the discharge being liquid and about 25% being so-called slush ice.

It is an object of my invention in general to provide an improved mechanism and process for producing such a refrigerant.

Another object of my invention is to provide an apparatus for producing crystals which is capable of continuous operation without periodical freezing of the parts in position.

Another object of my invention is to provide an apparatus and method for furnishing a large volume of refrigerant with a relatively small amount of equipment.

The foregoing and other objects are attained in the embodiment of the invention illustrated in the drawing, in which Fig. 1 is a diagram showing in cross-section an apparatus constructed in accordance with my invention; and Fig. 2 is a cross-section the plane of which is indicated by the line 2—2 of Fig. 1.

In a practical form of the apparatus utilized in carrying out the method, there is provided a tank or vat 6 which is preferably disposed in an insulated room or is so situated as to admit as little heat as possible. The vat 6 comprises ends, sides and a bottom but is preferably open to the atmosphere at the top except for a cross-beam 7 serving as a support for the freezing unit. There are as many cross-beams as there are freezing units in the vat, but since all of the freezing units are substantially identical, but one of them is illustrated and described.

Mounted on the beam 7 is a source of power, such as an electric motor 8, which rotates a drive-shaft 9 extending vertically from the top down into the central lower region of the vat 6. On the lower end of the shaft 9 is disposed a spider 11 from which depend top scrapers 12, external scrapers 13 and internal scrapers 14 adapted to be rotated in close juxtaposition with a refrigerant vessel 16. This vessel is conveniently comprised of a pair of metal cylinders 17 and 18 closed by metal annuli 19 and 21 to form a hollow annulus, with the exposed portions thereof in close running engagement with the scrapers 12, 13 and 14. Preferably, the various scrapers, at points remote from the spider 11, are interconnected for rigidity by a ring 23 common to the external scrapers and an internal ring 24 common to the interior scrapers.

In order to make the refrigerant chamber effective, it is supplied with a liquid refrigerant, such as ammonia, through a pipe line 26 provided with any suitable type of regulating device (not shown) to maintain an appropriate amount of ammonia within the interior 27 of the refrigerant vessel. Discharge of evaporated ammonia gas is through a stand pipe 28 extending adjacent the top of the vessel, passing through the bottom plate 21 and from the vat 6 by means of a connecting pipe 29. The structure is such that a refrigerant is circulated through the pipes 26 and 29 and expands within the refrigerant vessel to absorb heat therefrom.

In accordance with my invention, I preferably provide in the vat 6 a relatively large body of liquid from which ice crystals, as disclosed in my copending application, are to be formed. This liquid is preferably water including a small proportion of a salt (such as sodium chloride) and, for example, the water is supplied through a supply line 36 having a control valve 37 interposed therein and opening through an outlet 38 into the bottom of the vat 6. Preferably, a salt container 39 connects with the pipe 36, and the addition of salt is under the control of a valve 41. A drain pipe 42 is likewise provided in the vat 6 under the control of a valve 43, so that, when desired, the contents of the vat can be discharged.

The amount of liquid within the vat 6 is regulated by a valve 37 through a mechanical connector 46 with a controlling instrumentality, such as a float 47, mounted in a fitting 48 in the side wall of the vat. The water level 49 is preferably maintained at such a point above and away from the moving mechanism that the body of water within the vat is generally quiescent. In previous machines for producing ice crystals a relatively small body of liquid is closely confined with revolving members, comparable to the scrapers 13 and 14, so that the forming and formed crystals are kept in a state of rather violent agitation on or in close juxtaposition with the relatively moving parts. An extended practical experience with such previous devices has indicated that sooner or later crystals accumulate to an extent to cause a freezing of the rotating parts in the machine which either stops altogether or consumes an excessive amount of power and must be removed from service and thawed out before it is again ready for productive use.

But a special characteristic of the present apparatus is that the water level 49 is maintained at such a point above and away from the relatively rotating parts of the mechanism, and the general mass or body of liquid is so great, that the agitation of the formed crystals is relatively small at a short distance away from the moving parts, and a very prompt gravital separation of the liquid and crystals takes place. That is, as soon as the crystals are formed on the surfaces of the refrigerant vessel and are scraped off by the scrapers, they are free to separate gravitally and rise through the surrounding liquid to form a supernatant crystal layer 51 above the water level 49 and away from the revolving mechanism. Because the separation is gravital it is immediately effective and positive, and it is entirely possible in practice to operate a machine of the type disclosed indefinitely without undue crystal accumulation or freezing of the moving parts. So far as I am aware, while it is well known to scrape off formed crystals and remove them from the operating parts of the mechanism in company with a large amount of liquid in which they are retained in suspension, it has not heretofore been appreciated that there is a great advantage in arranging matters so that the crystals, as soon as scraped free from their forming surface, are free to separate gravitally from the active parts of the structure.

In accordance with my invention, the accumulated crystals 51 form a more or less distinct layer above the general body of water. There is ordinarily not a sharp line or plane of division between the body of water and the accumulated crystals, since even in the top of the liquid there is some motion, but the concentration of crystals is much greater at the top of the vat. The accumulated crystals and some relatively quiescent brine are discharged from the vat over an overflow weir 52, which comprises a relatively low portion of the side wall of the vat. When conditions are relatively constant, the float 41 can be dispensed with and the valve 37 can be set to provide a predetermined overflow sufficient to carry off the crystals as they accumulate but not in such excess as to impair the thermal efficiency of the operation.

The discharge fluid is carried to subsequent use by any suitable means, herein diagrammatically represented by a separating conveyor 53. In accordance with my copending application, the crystals ordinarily, upon discharge over the weir 52, are received in a tempering tank containing relatively warm water and are further processed prior to use, but the conveyor 53 indicates diagrammatically any subsequent disposition of the crystals after they leave the tank or vat 6.

I claim:

1. An ice maker comprising a vat adapted to contain liquid and a supernatant layer of ice crystals, means for supplying liquid to said vat, means for releasing supernatant ice crystals from said vat, a vessel within said vat and adapted to be submerged in said liquid well below said layer, means for circulating a refrigerant through said vessel, and means moving through and agitating said liquid around said vessel while leaving liquid adjacent said layer quiescent for removing ice crystals from said vessel 2. An ice maker comprising a stationary vessel, means for circulating a refrigerant through said vessel, a liquid-containing vat surrounding said vessel and of substantially greater height than said vessel, means for removing ice crystals from the outer walls of said vessel and simultaneously agitating said liquid, and means for maintaining liquid in said vat at a level to afford a quiescent body of liquid above said agitating means.

3. An ice maker comprising a hollow annular vessel disposed with its axis vertical, means for circulating a refrigerant through said vessel, a liquid containing vat surrounding said vessel, means for automatically maintaining liquid in said vat at a pre-determined level well above said vessel, a rotatable spider disposed within said vat coaxially with said vessel, scrapers on said spider designed to engage the inner and outer surfaces of said vessel, said scrapers being of sufficient extent to act as liquid agitators also but only well below said pre-determined level, and means for rotating said spider and said scrapers to remove ice from said vessel and simultaneously to agitate the liquid adjacent thereto, said liquid above said vessel remaining substantially quiet.

ELLIS H. SPIEGL.